Oct. 24, 1961  J. F. SAIFUKU  3,005,425
PINEAPPLE PLANTER
Filed Sept. 13, 1957  4 Sheets-Sheet 1
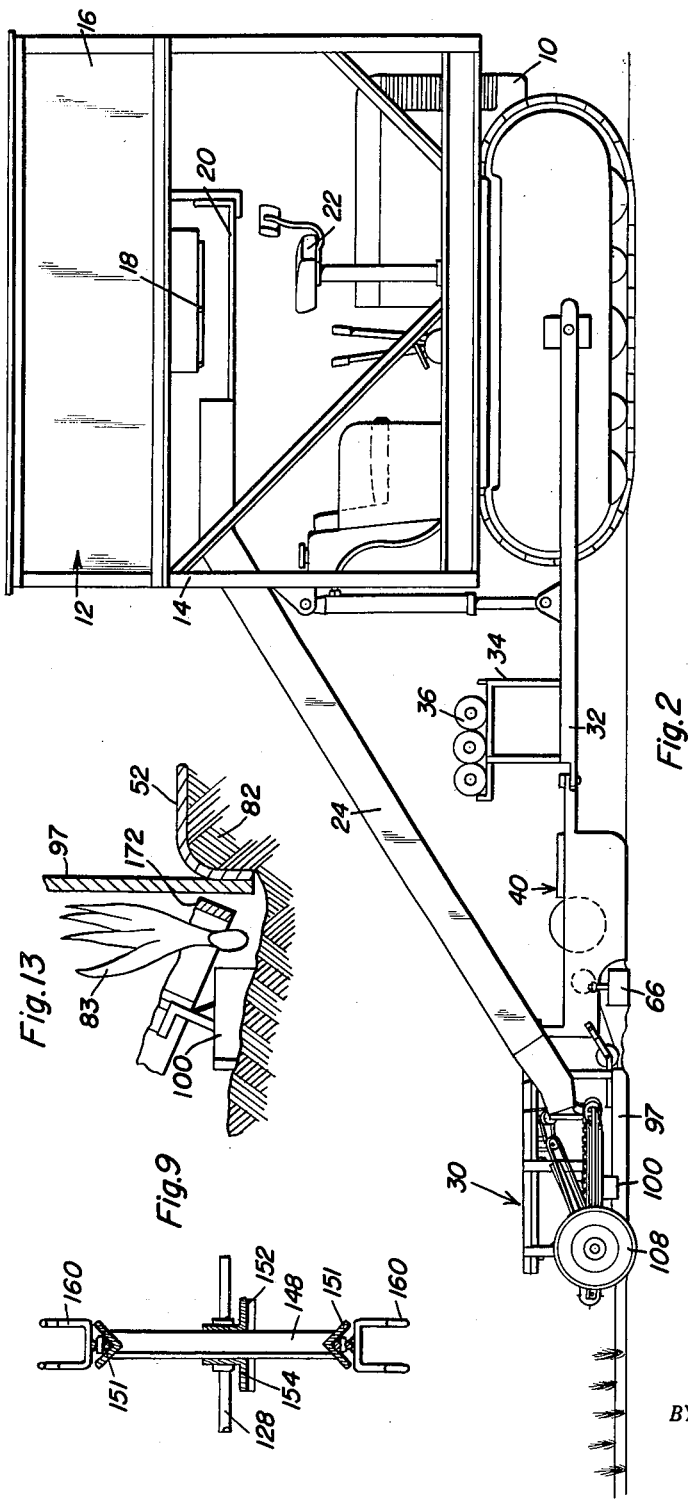
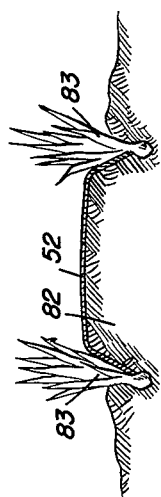
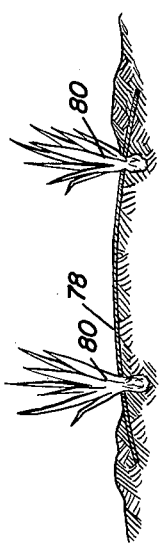
James F. Saifuku
INVENTOR.
BY Clarence A. O'Brien
and Harvey B. Jacobson
Attorneys

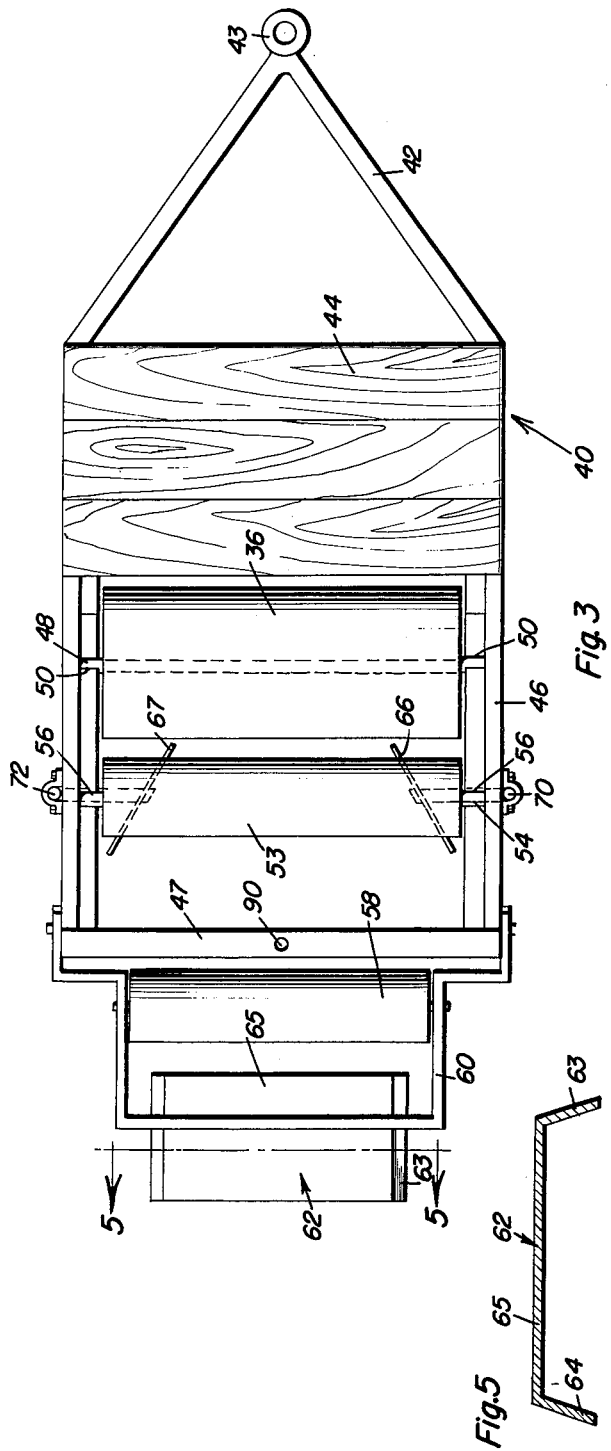

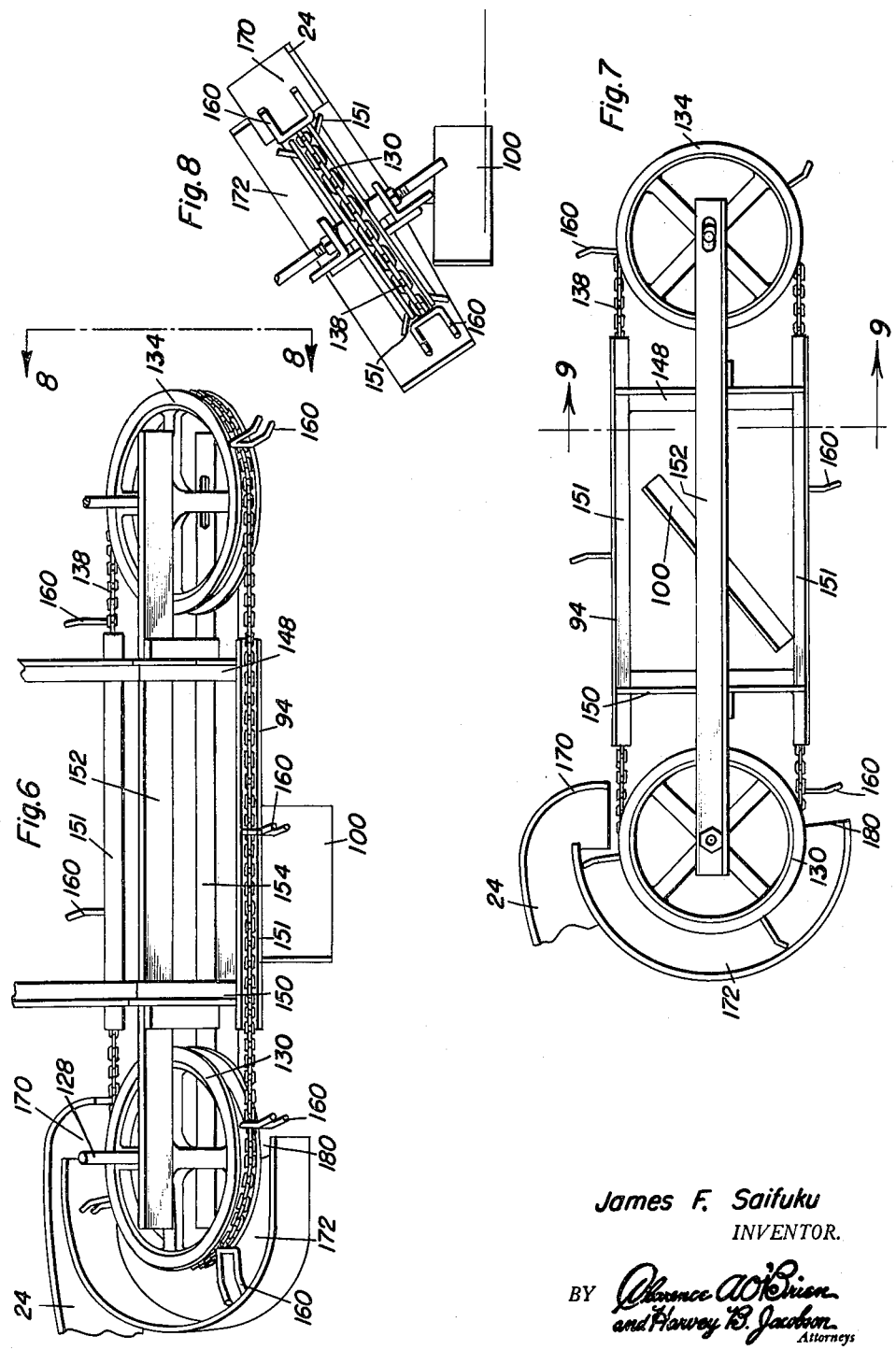

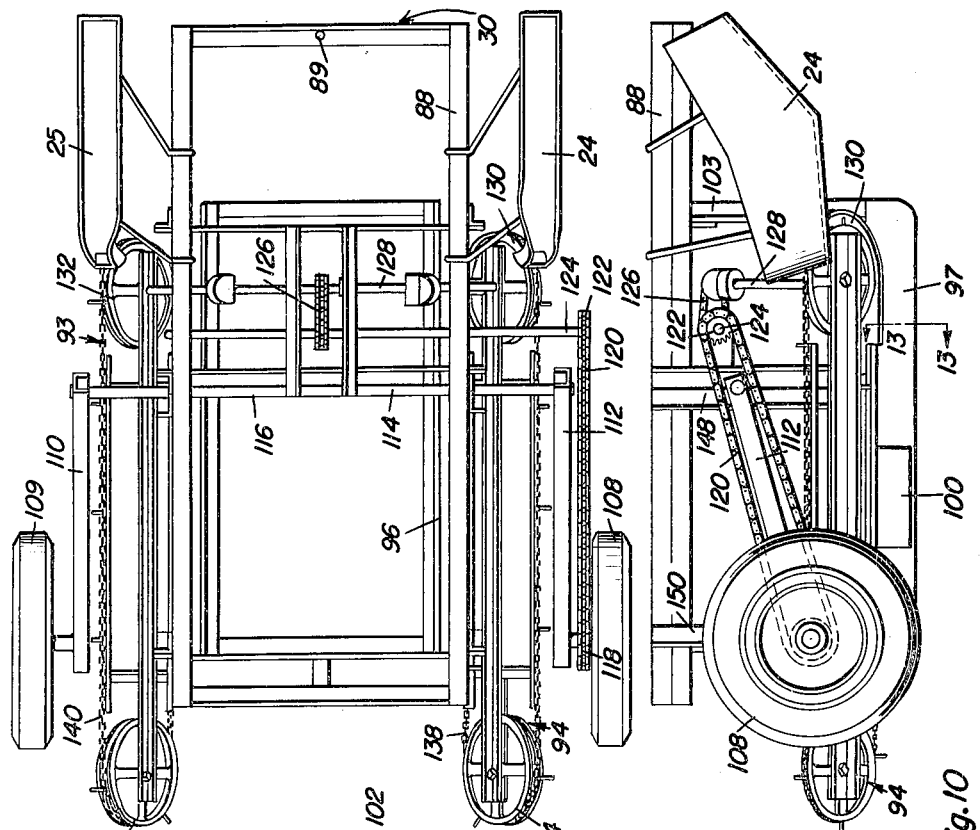

United States Patent Office 3,005,425
Patented Oct. 24, 1961

3,005,425
PINEAPPLE PLANTER
James F. Saifuku, 418 Kuulei Road, Lanikai, Hawaii
Filed Sept. 13, 1957, Ser. No. 683,791
8 Claims. (Cl. 111—3)

This invention relates to a planter and more particularly to a machine to set one or more rows of plants automatically with the forward progress of the planter.

An object of the invention is to provide improvements in the technique and the equipment for setting plants. Although the invention may be practiced in connection with various types of plants, the present intention is to have my equipment work with the setting of pineapple plants since this is the principal application of the principles of the invention. There are machines for laying mulch paper and for facilitating the setting of pineapple plants. My invention combines a mulch paper laying machine with a novel attachment for setting the pineapple plants. It is present practice to have holes in the mulch paper and to set the pineapple plants in the holes. My invention sets the plants alongside of downturned longitudinal edges of the mulch paper and throws soil alongside of the plants. Therefore, in setting pineapple plants, the procedure and technique distinguishes from what is present practice and in addition, the equipment for carrying out the new process is novel. Alterations in the way that the mulch paper is laid must be made in order to achieve the ends of the invention.

A further object of the invention is to provide a planter which is not only useful in connection with a mulch paper laying machine but which is separately useful, for the purpose of setting plants. The machine receives the plants at an inlet entrance to an endless conveyor that has spaced fingers by which the plants are propelled to a discharge station at which the plants are dropped into a furrow that is opened by a plow in advance of the machine. Packing wheels which follow the discharge station of the plant propelling conveyor, throw several inches of soil alongside of the plants.

When used with a mulch paper laying machine, the paper is applied in the soil with downturned edges. These downturned edges constitute barriers against which the plants are dropped when they are expelled from the endless conveyor. Hence, they form a backdrop or wall for the plants and soil that is thrown up over the lower parts of the plants, thereby holding the plants erect and fully setting them so that no manual handling is necessary.

Other objects and important features such as the speed and accuracy with which the machine is capable of operating, will become apparent in following the description of the illustrated form of the invention.

FIGURE 1a is a schematic view showing pineapple plants which are set in accordance with present practice.

FIGURE 1b is a schematic sectional view showing pineapple plants set in accordance with the invention and by the equipment disclosed herein.

FIGURE 2 is an elevational side view of a typical assembly which includes a machine for laying mulch paper, a tractor fitted with an attachment to feed pineapple plants to the novel plant setting machine which tracks the paper laying machine and tractor.

FIGURE 3 is a top view of the paper laying machine.

FIGURE 4 is an elevational side view of the paper laying machine of FIGURE 3.

FIGURE 5 is a cross-sectional view taken on the line 5—5 of FIGURE 3 and showing an alteration in a paper laying machine so that the paper laying machine will be capable of functioning to produce a planting configuration such as shown in FIGURE 1b.

FIGURE 6 is a perspective view of a planter constructed in accordance with the invention and turned 180°.

FIGURE 7 is a top view of the planter of FIGURE 6 turned 180°.

FIGURE 8 is an end view of the planter in FIGURE 6 showing the angle at which the planter ordinarily operates as viewed in a direction indicated by line 8—8 in FIGURE 6.

FIGURE 9 is a sectional view of the planter in FIGURE 7 and taken along the line 9—9 of FIGURE 7.

FIGURE 10 is a side view of the planter as it appears in FIGURE 2.

FIGURE 11 is a top view of the planter in FIGURE 10.

FIGURE 12 is a perspective view of a moldboard assembly which forms a backing for the plants when the soil is thrown against the plants, the moldboard location being between the downturned edges of the paper, when paper is used, and the plants.

FIGURE 13 is a partial sectional view illustrating the setting of a plant in accordance with the invention, as viewed from line 13—13 in FIGURE 10.

In the accompanying drawings there is a tractor 10 on which a plant feeder 12 is mounted. The feeder consists of an overhead framework 14 that supports a storage bin 16 in which there is a supply of plants. The plants fall through trap door 18 onto sorting table 20 so that an operator in chair 22 can feed the selected plants down chute 24. The sorted plants are stacked in the chute or trough which feeds to the inlet of planter 30. In a typical arrangement there will be two planters 30 and two chutes 24 to feed the respective planters, although both planters may be carried in a single unit as a part of a wheeled vehicle.

Tongue 32 is attached to the tractor 10 and has a stand 34 on which rolls 36 of mulch paper are stored. The mulch paper laying machine 40 (FIGURES 3–5) has a tongue 42 with an eye 43 through which a pin is passed coupling the tongue 42 with the tongue 32 of the tractor 10. Platform 44 is formed on the generally rectangular frame 46 of the paper laying machine 40, accommodating a roll 36 of mulch paper, not in use, near platform 44. The roll of mulch paper not being used, that is carried in the paper laying machine 40, has an axle 48 passed through its center and disposed in notches 50 that are in the frame 46 of machine 40. Roll 53 of mulch paper from which mulch paper 52 is being drawn, is on an axle 54 whose ends are disposed in upwardly opening notches 56 formed in frame 46. The paper 52 is payed from the roll 53 and extends beneath the presser roll 58 that is carried by a protruding frame 60 on the rear end of the paper laying machine 40. Guide 62 is carried by frame 60 behind roller 58 and is of generally U-shaped configuration. It has sides 63 and 64 which connect to the top wall 65 along its edges. The sides are inclined outwardly slightly and operate on the sides of a mound which is formed by the two plows 66 and 67 secured to the sides of the frame 46 of paper laying machine 40. The two plows are attached to plow supporting arms 70 and 72 and, these are held in selected vertically adjusted positions by means of clamps 73 on the sides of the frame 46 of the machine 40.

Reference is now made to FIGURES 1a and 1b. In the past mulch paper 78 was laid on the surface of the soil and formed with a number of spaced holes in which plants 80 were set. Soil was spilled over the edges of the mulch paper 78 to hold it down. Plows 66 and 67 form an elongate mound 82 on which the paper 52 is applied. The guide 62 presses the sides of the paper down over the sides of the mound 82 as shown in FIGURE 1b. Note that no holes are formed in the paper as in FIGURE 1a, and that the plants 83 are set alongside of the sides of the paper 52 and not through apertures that are formed in the mulch paper.

The planter 30 has a planter frame 88 whose front member has a coupling 89 by which to attach to coupling 90 on the rear cross member 47 of the frame 46 of machine 40. Accordingly, the planter tracks the paper laying machine. As shown in FIGURE 11 the planter is symmetrical about a center line and consists of two planter units 93 and 94 that are fed individually from troughs or chutes 24 that extend from sorting table 20. Frame 88 has an inner frame 96 that is approximately rectangular and that has two moldboards 97 and 98 attached to and depending from its lower sides. These moldboards fit alongside of the sides of the paper 52 (FIGURE 1b) and form a backstop for the plants that are discharged from the planters and for the soil that is thrown against and over the lower parts of the plants as shown in FIGURE 13. Two packing plows 100 that are attached to the two planting units 93 and 94, throw the soil up against the sides of the plants 83 (FIGURE 1b) to a depth of about 3 or 4 inches.

Two uprights 102 and 103 rise from the front corners of frame 96, and there is an inclined upright 104 at the opposite end of frame 96 that attaches to the structure of the frame of planter 30.

Frame 88 of planter 30 has a pair of ground wheels, 108 and 109, that are carried by wheel spindles secured to torque arms 110 and 112. These are attached to torque rods 114 and 116 that are welded or otherwise secured and if necessary, braced to frame 88. Wheel 108 or its spindle, provided that its spindle is rotatable, has a sprocket 118 fixed for rotation with it. Chain 120 is entrained around sprocket 118 and also around sprocket 122 which is attached to jack shaft 124. This jack shaft is carried in bearings on frame 88 and has a sprocket and chain drive 126 intermediate its ends and drivingly connected to the lay shaft 128. The lay shaft is in two parts which angle downwardly towards the sides of the machine and which are attached to the drive wheels 130 and 132 respectively of the two unis 94 and 93. The units have rear wheels 134 and 136, and there are endless conveyor chains 138 and 140 that are entrained around pairs of the wheels and are nested in the pairs of V-shaped guides 151 between the wheels of each pair. The speed of the conveyors is synchronized with ground speed by proper selection of sprockets.

Planter unit 94 is typical and is shown in detail in FIGURES 6–9. It consists of a frame which is made of a pair of cross members 148 and 150 welded or otherwise attached to the longitudinal parallel frame members 152 and 154 to hold them in a fixed relationship to each other. Cross members 148 and 150 have the guides 151 attached to their ends, said members 148 and 150 also function as hangers in that their upper ends are fixed to the main frame 88 of the planter 30. The bearings for one of the wheels, for example wheel 134, are adjustable by having a slot in the longitudinal frame members 152 and 154 and by bolting the bearing in selected, adjusted positions. This forms a tightener for the endless conveyor.

There are pairs of fingers 160 that have angulated outer ends. These fingers are attached at spaced intervals along the length of the endless conveyor and form pushers for the pineapple plants as they are fed into the planter unit.

The pineapple plants descending from the chute 24, enter the inlet 170 of the planter unit 94, which is formed by a curved end of the chute 24. This curved end of the chute has slots in it through which fingers 160 are capable of passing for propelling the pineapple plants along the arcuate guide 172 that is mounted beneath the wheel 130 and the fingers that are carried by the conveyor 138. This guide has a bottom and an arcuate side wall and the angle at which the unit ordinarily operates (FIGURE 8), holds the plants erect while they are being propelled to the discharge station 180 formed by the terminal of the side wall and the bottom of guide 172.

In use of the invention, the tractor 10 is propelled through a field at approximately 5 miles per hour in accordance with present design and available power. The pineapple plants from storage bin 16 are taken from sorting table 10 and loaded onto chutes 24 and 25. These chutes constantly feed the planting units 93 and 94 of the planter 30 in the manner described. Meanwhile and in advance of the planter units, the mulch paper is applied on the soil in the manner considered to be new at the present time. After the mulch paper 52 is laid as shown in FIGURE 1b, the pineapple plants are placed next to its sides as shown in FIGURE 13, and they are covered to a depth of three or four inches by the plows 100 of the planter unit.

It is understood that various changes and modifications may be made without departing from the invention, as claimed.

What is claimed as new is as follows:

1. A planter for setting pineapple plants, said planter comprising the combination of a plant feed chute having a discharge end, a frame, an endless conveyor carried by said frame, means connected to said conveyor for actuating said conveyor, a portion of said endless conveyor in registry with the discharge end of said plant feed chute, said endless conveyor having spaced fingers thereon which gather plants directly from said discharge end of said chute for movement by said conveyor, a guide connected to said frame and located adjacent to said portion of said conveyor and coacting with said portion of said conveyor to form a passageway within which the movement of the plants are constrained as they are propelled by said conveyor, said guide and conveyor having a plant discharge outlet from which the plants are adapted to drop, a moldboard attached to said frame and located alongside of said plant discharge outlet to form a backstop for the plants, and means for directing soil over the plants and against a portion of the moldboard.

2. A planter for setting pineapple plants, said planter comprising the combination of a plant feed chute having a discharge end, a frame, an endless conveyor carried by said frame, means connected to said conveyor for actuating said conveyor, a portion of said endless conveyor in registry with the discharge end of said plant feed chute, said endless conveyor having spaced fingers thereon which gather plants directly from said discharge end of said chute for movement by said conveyor, a guide connected to said frame and located adjacent to said portion of said conveyor and coacting with said portion of said conveyor to form a passageway within which the movement of the plants are constrained as they are propelled by said conveyor, said guide and conveyor having a plant discharge outlet from which the plants are adapted to drop, said endless conveyor having a pair of spaced wheels and a flexible endless member entrained thereover, means mounting said wheels for rotation on said frame with the axes of rotation of said wheels inclined at an angle with respect to vertical and horizontal reference planes so that the entire conveyor operates in a tilted orientation, the plant receiving inlet of the conveyor being at the higher side of the tilted conveyor, and said discharge outlet located at the lower side of said conveyor.

3. In a plant setting assembly, a mulch paper laying machine, said machine having means for forming an elongate mound and laying the paper thereon, mechanical means for turning down the longitudinal side edges of the paper on the sides of the mound, a planter, means connected with said planter for locating said planter behind said machine and for moving said planter in unison with the forward movement of said machine, means constituting a part of said planter for depositing plants on the soil at locations laterally outwardly of the down-turned side edges of the paper but closely adjacent thereto even to the point of touching the longitudinal edges of the paper, and plow means connected with said planter for throwing soil against the plants from the outer sides thereof as measured with reference to the longitudinal center line of the laid paper and at the same time throwing soil against said downturned side edges of the paper for holding the paper with the result that the plants are partially covered with soil and the paper held fast by some of the same soil in a single simultaneous operation.

4. The combination of a machine for laying mulch paper with downturned edges including an inclined chute within which plants are placed, a plant depositing means connected to and located behind said machine and connected to said chute for receiving plants therefrom and tracking said paper laying machine, said plant depositing means comprising a conveyor having an inlet and an outlet for the plants, the inlet being in registry with said chute, said outlet being operatively located to one side of the mulch paper for discharging plants alongside of downturned edges of the mulch paper as laid by said machine and closely adjacent thereto.

5. In combination with a mulch paper laying machine including means downturning edges of the paper and a plant delivery chute, a planter connected to and located behind said machine and connected to said chute for receiving plants therefrom to track said paper laying machine, said planter comprising a conveyor having an inlet and an outlet for the plants, the inlet being in registry with said chute, said outlet discharging plants laterally outwardly of and alongside of a downturned edge of the paper as laid by said machine, said planter having a frame, and means carried by said frame at a position laterally outwardly from said conveyor outlet for deflecting soil toward the side edges of the paper and the plants after they are deposited laterally outwardly of and closely alongside of said downturned edge of the paper.

6. The combination of claim 5 wherein there is a moldboard carried by said planter frame and disposed between said outlet and said paper edge to form a backstop for the plants and soil that are deposited alongside of the downturned edge of the mulch paper.

7. A planter for pineapple plants in combination with a machine for laying mulch paper wherein the mulch paper laying machine has means to apply the paper on the soil with the sides of the paper directed generally downwardly, said planter comprising a frame, means mounted on the frame and having a plant discharge outlet for depositing plants at spaced intervals beyond the sides and closely alongside of downturned longitudinal edges of the paper as said planter is moved behind said paper laying machine, a plow carried by said frame and located behind the discharge outlet, said plow angled to pack soil over the lower parts of the plants and the sides of the mulch paper so that the mulch paper has a part located alongside of each plant.

8. The planter of claim 7 wherein said plant depositing means include an endless conveyor, conveyor actuating means connected with said conveyor, a fixed guide adjacent to said endless conveyor and coacting therewith to form a passageway for the plants, and fingers on said conveyor having angulated ends for propelling the plants from the inlet to the outlet of the conveyor.

References Cited in the file of this patent
UNITED STATES PATENTS

| | | |
|---|---|---|
| 1,436,139 | Bailey | Nov. 21, 1922 |
| 1,864,672 | Rose et al. | June 28, 1932 |
| 1,926,476 | Dekker | Sept. 12, 1933 |
| 1,930,939 | Horner | Oct. 17, 1933 |
| 2,588,787 | Wright | Mar. 11, 1952 |
| 2,708,812 | Nakai | May 24, 1955 |
| 2,749,855 | Guigas | June 12, 1956 |
| 2,792,937 | Searles | May 21, 1957 |
| 2,890,665 | Kang | June 16, 1959 |

FOREIGN PATENTS

| | | |
|---|---|---|
| 105,875 | Australia | Nov. 17, 1938 |
| 280,419 | Great Britain | Nov. 17, 1927 |
| 437,757 | Italy | July 12, 1948 |